US008378294B2

(12) United States Patent
Mukaibatake

(10) Patent No.: US 8,378,294 B2
(45) Date of Patent: Feb. 19, 2013

(54) METHOD OF ATMOSPHERIC PRESSURE IONIZATION FOR MASS SPECTROMETER

(75) Inventor: Kazuo Mukaibatake, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 57 days.

(21) Appl. No.: 12/989,062

(22) PCT Filed: May 20, 2008

(86) PCT No.: PCT/JP2008/001257

§ 371 (c)(1), (2), (4) Date: Oct. 21, 2010

(87) PCT Pub. No.: WO2009/141847

PCT Pub. Date: Nov. 26, 2009

(65) Prior Publication Data

US 2011/0036976 A1 Feb. 17, 2011

(51) Int. Cl.
*B01D 59/44* (2006.01)

(52) U.S. Cl. ........................................ 250/288

(58) Field of Classification Search .................. 250/288
See application file for complete search history.

(56) References Cited

U.S. PATENT DOCUMENTS

| | | | | |
|---|---|---|---|---|
| 6,541,767 | B1 * | 4/2003 | Kato | 250/288 |
| 6,649,907 | B2 * | 11/2003 | Ebeling et al. | 250/288 |
| 7,355,172 | B2 * | 4/2008 | Matsui et al. | 250/288 |
| 2005/0017164 | A1 | 1/2005 | Mukaibatake | 250/288 |

FOREIGN PATENT DOCUMENTS

| | | |
|---|---|---|
| JP | 2001-041930 | 2/2001 |
| JP | 2001097743 A | 4/2001 |
| JP | 2002020881 A | 1/2002 |
| JP | 2002-107344 | 4/2002 |
| JP | 2004207713 A | 7/2004 |
| JP | 3121568 | 4/2006 |
| JP | 2008-014788 | 1/2008 |

OTHER PUBLICATIONS

International Preliminary Report on Patentability and Written Opinion for the counterpart International Application No. PCT/JP2008/001257, Jan. 11, 2011.

Japanese language office action dated Apr. 10, 2012 and its English language translation issued in corresponding Japanese application 2010512846.

Korean language office action dated May 21, 2012 and its English language translation issued in corresponding Korean application 200880129237.2.

Japanese language office action dated Aug. 7, 2012 and its English language translation issued in corresponding Japanese application Aug. 7, 2010.

* cited by examiner

*Primary Examiner* — Kiet T Nguyen

(74) *Attorney, Agent, or Firm* — DLA Piper LLP (US)

(57) ABSTRACT

The present invention aims at suppressing noises when a mass analysis is performed by introducing a sample solution into an atmospheric pressure ion source by a pressurized liquid feeding method. As a dilution solvent of the sample solution contained in a sample container, a mixed liquid is used in which the mixture ratio of an organic solvent such as methanol is decreased to 20% and the ratio of water is 80%. Since nitrogen, which is a gas for the pressurization, is soluble in an organic solvent, decreasing the ratio of the organic solvent lowers the saturated dissolution amount and suppresses unstable emergence of the gas in the process of the mass analysis. Consequently, even after the elapse of a considerable length of time from the start of liquid feeding, spike-like noises do not appear in the ion intensity, which stabilizes the ion intensity.

1 Claim, 2 Drawing Sheets

METHOD OF ATMOSPHERIC PRESSURE IONIZATION FOR MASS SPECTROMETER

CROSS-REFERENCE TO THE RELATED APPLICATIONS

This application is a national stage of international application No. PCT/JP2008/001257, filed May 20, 2008, the entire contents of which are incorporated herein by reference.

TECHNICAL FIELD

The present invention relates to a mass spectrometer having an atmospheric pressure ion source for ionizing a liquid sample. More precisely, it relates to a mass spectrometer for introducing a liquid sample into an atmospheric pressure ion source.

BACKGROUND ART

In a liquid chromatograph mass spectrometer, which uses a mass spectrometer as a detector for a liquid chromatograph, an atmospheric pressure ion source is used to ionize a liquid sample. Such an atmospheric pressure ion source uses an electrospray ionization method, atmospheric pressure chemical ionization method, or other methods. During an analysis, the eluate from a column of a liquid chromatograph is introduced into a mass spectrometer. On the other hand, when a tuning for each unit of the mass spectrometer is performed, a standard sample composed of components whose kinds and concentrations are known is directly introduced into the mass spectrometer. “Tuning” as used herein refers to optimally setting conditions such as voltages applied to each unit and the temperature of an ionization probe in order to perform an m/z value calibration, adjustment of the mass resolution, adjustment of the sensitivity, and other conditions.

One known method for directly introducing a standard sample into an atmospheric pressure ion source is a pressurized liquid feeding method. In the pressurized liquid feeding method, a gas at a certain pressure is introduced via a pressurization tube into an in-chamber space above the liquid surface of a closed chamber which contains a standard sample (or solution). This gas presses down the liquid level of the standard sample, and the standard sample is supplied to the outside of the chamber by way of a liquid feeding tube extending from below the liquid surface (refer to Patent Document 1).

In recent years, the configuration of a mass spectrometer has become very complicated, and also the number of units and items that have to be tuned has been increasing. Consequently, the time required for tuning has become longer. In such circumstances, it has been found that spike-like noises are generated in a detected signal in the case where a standard sample is introduced by using a sample introduction apparatus by a pressurized liquid feeding method as previously described. The longer the time to perform the pressurized liquid feeding is, the more noticeable such spike-like noises become. The effect of the noise may be insignificant when the time required for tuning is short; however, when the tuning time becomes long, the noise causes serious problems, such as disturbing the appropriate tuning.

[Patent Document 1] Japanese Unexamined Patent Application Publication No. 2008-14788

DISCLOSURE OF THE INVENTION

Problem to be Solved by the Invention

The present invention has been developed to solve the aforementioned problem and the objective thereof is to provide an atmospheric pressure ionization mass spectrometer capable of suppressing a noise generated in the detection signal when a standard sample is fed by the pressurized liquid feeding method, enabling an accurate tuning.

Means for Solving the Problem

Based on a variety of experiments, the inventor of the present patent application have found that the previously described generation of spike-like noises is caused by the fact that a gas used for pressurization is dissolved in the sample dilution solvent and unsteadily appears in the detection signal. Conventionally and generally, a mixed liquid of water and an organic solvent such as methanol with a mixture ratio of 50/50% has been used as the sample dilution solvent. As the pressurization gas, nitrogen gas has been used, which is easy to handle, inexpensive, and generally used for atmospheric pressure ionization mass spectrometers. However, with the combination of the aforementioned mixed liquid and nitrogen gas, the amount of gas dissolved in the mixed liquid is relatively large. Given this factor, the inventor of the present patent application have examined both the kind of gas and the kind of solvent with the aim of decreasing the amount of gas dissolved into the solvent, and have completed the present invention.

To solve the previously described problem, the first aspect of the present invention provides an atmospheric pressure ionization mass spectrometer in which a pressurized gas is introduced into a space above a liquid surface of a container containing a sample solution and the sample solution is fed to an atmospheric pressure ion source by way of a liquid feeding tube extending from below the liquid surface of the sample solution, wherein a mixed liquid of water and an organic solvent is used as a solvent of the sample solution, and the ratio of the organic solvent in the mixed liquid is less than 50%.

The organic solvent may be methanol, acetonitrile, hexane, benzene, or others of such kinds.

Generally, in an atmospheric pressure ion source, a sample solution is sprayed from the tip of a nozzle into a space at atmospheric pressure. Since water has a large surface tension, the size of the sprayed droplets is too large if the solvent is composed of only water. Mixing water with an organic solvent decreases the surface tension and the size of the droplets, allowing an efficient ionization of the sample components. Hence, it is practically essential to mix a sample dilution solvent with an organic solvent. If the mixture ratio of the organic solvent is too low, the previously described effect of decreasing the surface tension is not sufficiently exerted, which reduces the ionization efficiency. Given these factors, it is preferable that the mixture ratio of the organic solvent in the mixed liquid is higher than approximately 10%.

On the other hand, the amount of nitrogen gas soluble in water is approximately from one third or one fourth to one tenth of the amount of nitrogen gas soluble in an organic solvent. Hence, in order to decrease the amount of nitrogen gas which is dissolved in the sample solution, it is preferable to set the mixture ratio of the organic solvent to be as small as possible and below 50%. Taking into account the aforementioned lower limit of the mixture ratio of the organic solvent, the preferable mixture ratio of the organic solvent is approximately from 10 to 30%.

To solve the previously described problem, the second aspect of the present invention provides an atmospheric pressure ionization mass spectrometer in which a pressurized gas is introduced into a space above a liquid surface of a container containing a sample solution and the sample solution is fed to an atmospheric pressure ion source by way of a liquid feeding tube extending from below the liquid surface of the sample solution, wherein helium is used as the gas for pressurization.

The amount of helium soluble in an organic solvent is approximately from one third or one fourth to one tenth of that of nitrogen gas. Therefore, even if a conventional mixed liquid, e.g. a mixed liquid of water and an organic solvent with a mixture ratio of 50/50%, is used as a sample dilution solvent, the use of helium in place of nitrogen gas as the pressurizing gas can sufficiently decrease the amount of the pressurized gas to be dissolved in the sample solution.

Effect of the Invention

With an atmospheric pressure ionization mass spectrometer according to the first and second aspects of the present invention, the amount of the pressurized gas which is dissolved in the sample solution is significantly reduced as compared to the conventional methods. This can suppress the generation of spike-like noises caused by the unsteady emergence of the gas in a mass analysis. Consequently, an appropriate and accurate tuning can be performed when, for example, the tuning is performed by using a standard sample. In particular, this effect is noticeable when a complicated tuning is required and the tuning process takes a long period of time.

EXPLANATION OF NUMERALS

1 . . . Gas Supply Source
2 . . . Pressure Controller
3 . . . Pressure Gauge
4 . . . Pressurization Tube
5 . . . Sample Container
6 . . . Sample Solution
7 . . . Liquid Feeding Tube
8 . . . Ionization Probe
9 . . . Mass Analyzer
10 . . . Detector

BEST MODE FOR CARRYING OUT THE INVENTION

Figure 1:
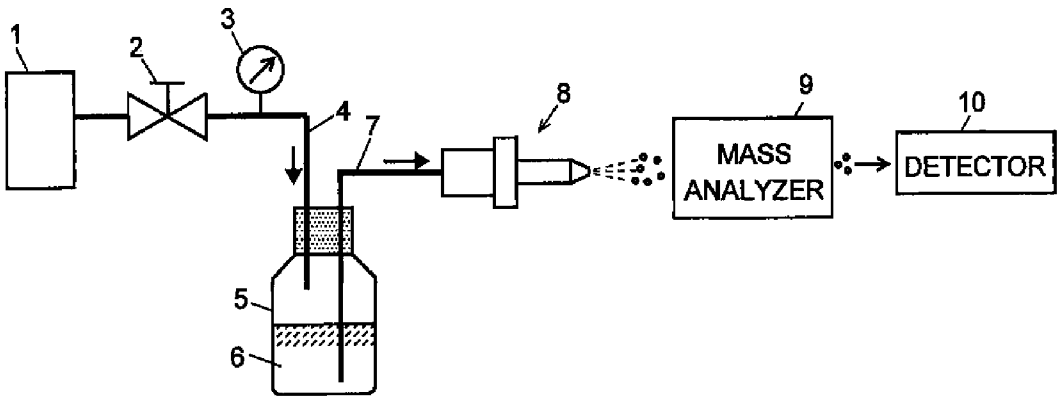
FIG. 1 is a schematic configuration diagram of an atmospheric pressure ionization mass spectrometer, mainly illustrating a pressurized liquid feeding type sample introduction apparatus which employs the present invention.

FIG. 1 is a schematic configuration diagram of an atmospheric pressure ionization mass spectrometer, mainly illustrating a pressurized liquid feeding type sample introduction apparatus which employs the present invention.

The sample container 5 which contains a sample solution 6, such as a standard sample, is hermetically closed. The gas provided from the gas supply source 1, such as a gas tank, is regulated by the pressure controller 2 so that the gas pressure detected by the pressure gauge 3 will be approximately 100 [kPa] for example. This regulated gas is fed into the space above the liquid surface in the sample container 5 via the pressurization tube 4. Consequently, strong pressure is applied to the sample solution 6 in the sample container 5 in such a manner that the liquid surface is pressed down.

One end of the liquid feeding tube 7 is immersed in the sample solution 6, and the other end thereof is connected to an ionization probe 8 in an atmospheric pressure ion source. The sample solution 6 is pressed down by the pressure of the gas as previously described, and fed to the ionization probe 8 via the liquid feeding tube 7 at a constant flow rate. In the case where the ionization probe 8 is designed for electrospray ionization, a sample solution which has reached the tip of the ionization probe 8 is sprayed into a space at atmospheric pressure while being given an electric charge. Coming into contact with the surrounding atmosphere, the charged droplets are micronized, and the vaporization of the solvent in the droplets is accelerated. During this process, the sample molecules become electrically charged, turn to ions, and are then ejected. The generated ions are introduced to a mass analyzer 9, such as a quadrupole mass filter, where they are separated in accordance with their m/z value and then detected by the detector 10.

In an atmospheric pressure ionization mass spectrometer, a multistage differential pumping system is generally used in order to place the mass analyzer 9 and the detector 10 in a high vacuum atmosphere.

When the aforementioned sample introduction apparatus is used in order to tune the mass analyzer of a liquid chromatograph mass spectrometer, either a standard sample coming through the liquid feeding tube 7 or an elute from the column of the liquid chromatograph is selected and introduced into the ionization probe 8 by a channel switching valve.

Figure 3:
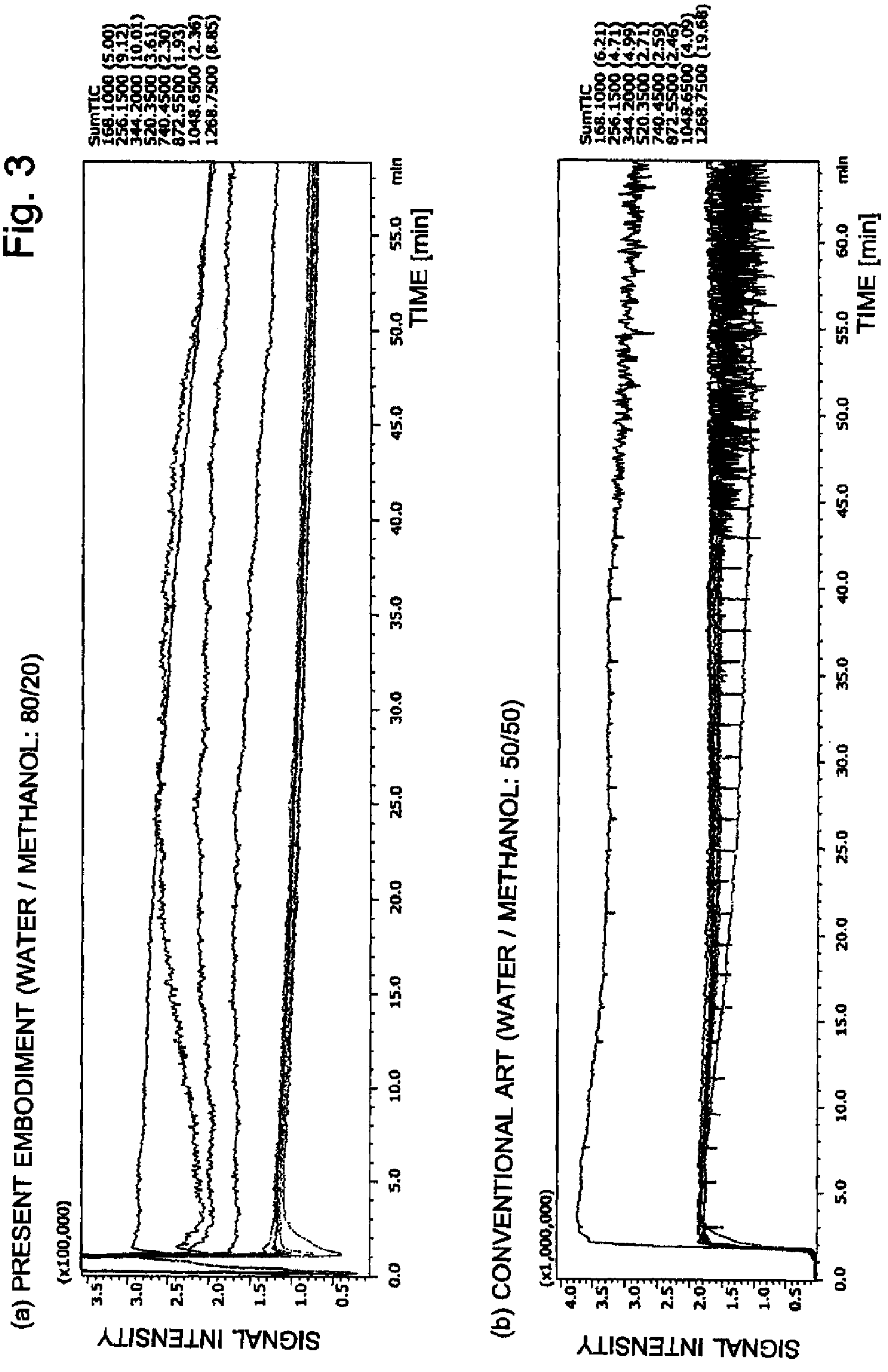
FIG. 3 is a graph showing actually measured relationships between the duration time of the pressurized liquid feeding and the signal intensity.

The sample solution 6 is composed of sample components dissolved in a sample dilution solvent. Conventionally and generally, a mixed liquid of water and methanol having a mixture ratio of 50/50% has been used as the dilution solvent, and nitrogen gas has been used as the pressurizing gas supplied from the gas supply source 1. An actually measured relationship between the duration time of a pressurized liquid feeding and the signal intensity (or ion intensity) in this case is shown in FIG. 3(*b*). FIG. 3 shows the result of an actual measurement in which a standard sample (polyethylene glycol) was introduced into the ionization probe 8 and the ion intensity and total ion intensity of each of the ions of m/z=168.10, 256.15, 344.20, 520.35, 740.45, 872.55, 1048.65, and 1268.75 were measured until 65 minutes elapsed from the point in time when the pressurized liquid feeding was started. In this figure, the relationship between each line on the graph and the m/z values is not specified because the difference of the variation of ion intensity among different m/z values is not important.

FIG. 3(*b*) shows that the ion intensity was relatively stable for a while after the initiation of the liquid feeding; however, after 40 minutes elapsed, spike-like noises gradually increased, making the ion intensity considerably unstable. If a tuning for the mass analyzer 9 or other unit is performed based on such an unstable ion intensity, wrong or inappropriate conditions might be set.

As will be described later, nitrogen gas is soluble in methanol, which is an organic solvent, but is difficult to be dissolved in water. Given this factor, in order to suppress the dissolution of nitrogen gas into the sample solution 6, a mixed liquid in which the mixture ratio of methanol is decreased to 20% and that of water is 80% is used as a dilution solvent. An actually measured relationship between the duration time of a pressurized liquid feeding and the signal intensity (or ion intensity) in this case is shown in FIG. 3(*a*). As is clear from this figure, even after 40 minutes elapsed from the point in time when the pressurized liquid feeding was started, spike-like noises hardly appeared and the ion intensity was stable. This is probably because the amount of nitrogen gas which can be dissolved in the sample solution 6 (or a saturated dissolution amount) is so small that the amount of gas dissolved in the sample solution 6 does not increase even if the period of time for the pressurized liquid feeding is long.

The effect of suppressing the noise probably improves almost linearly as the mixture ratio of methanol approaches 20%, down from 50%. In order to achieve a well-marked effect compared to conventional methods, it is preferable to decrease the mixture ratio of methanol to approximately 30%. Meanwhile, if the mixture ratio of methanol is decreased to less than 10%, the ionization efficiency will noticeably decrease, causing a problem in terms of the detection sensitivity. Hence, in view of both factors, it is preferable to set the mixture ratio of methanol within the range approximately from 10 to 30%. The boundary values of this range are not very rigorous, as a matter of course.

Figure 2:
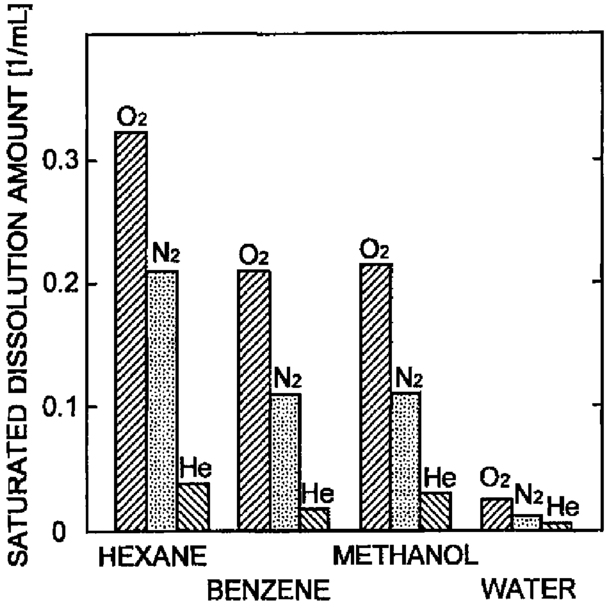
FIG. 2 is a graph for explaining the difference of the saturated dissolution amounts of gases in the solvent.

FIG. 2 is a diagram for explaining the difference of the saturated dissolution amount depending on the kind of solvent and the kind of gas. Hexane, benzene, and methanol are an organic solvent. As for nitrogen gas, which was used in the aforementioned example, a comparison between the saturated dissolution amount in the organic solvents and that of water shows that the latter is from one third or one fourth to one tenth of the former or even less. This confirms that decreasing the mixture ratio of an organic solvent can suppress the dissolution amount of nitrogen gas. In addition, it is easy to deduce from FIG. 2 that the same result will be obtained also in the case where an organic solvent other than methanol is used.

A comparison between nitrogen gas and helium shows that the saturated dissolution amount of helium is from one third or one fourth to one tenth of that of nitrogen gas for the same organic solvent, or even less than that. Hence, this indicates that by merely substituting helium for nitrogen gas as the pressurizing gas (without changing the mixture ratio of the organic solvent and water from the conventional value), the same effect can be achieved as in the previously described case where the mixture ratio of the organic solvent is decreased, i.e. the effect of suppressing spike-like noises can be achieved.

It should be noted that the embodiment described thus far is merely an example of the present invention, and it is evident that any modification, addition, or adjustment made within the spirit of the present invention is also included in the scope of the claims of the present application.

The invention claimed is:

1. A method for introducing a sample into an atmospheric pressure ionization mass spectrometer, comprising:

introducing a pressurized gas into a space above a liquid surface of a container containing a sample solution;

feeding the sample solution to an atmospheric pressure ion source by way of a liquid feeding tube extending from below the liquid surface of the sample solution, wherein a mixed liquid of water and an organic solvent is used as a solvent of the sample solution, and a ratio of the organic solvent in the mixed liquid is in a range approximately from 10 to 30%.

* * * * *